(12) United States Patent
Meyrick et al.

(10) Patent No.: US 6,344,497 B1
(45) Date of Patent: *Feb. 5, 2002

(54) AQUEOUS INK COMPOSITIONS

(75) Inventors: Barry Huston Meyrick, Manchester; Mark Holbrook, Bury, both of (GB)

(73) Assignee: Avecia Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,063

(22) PCT Filed: Sep. 19, 1997

(86) PCT No.: PCT/GB97/02555

§ 371 Date: Mar. 29, 1999

§ 102(e) Date: Mar. 29, 1999

(87) PCT Pub. No.: WO98/14524

PCT Pub. Date: Apr. 9, 1998

(30) Foreign Application Priority Data

Oct. 1, 1996 (GB) .............................................. 9620445
May 7, 1997 (GB) .............................................. 9709126

(51) Int. Cl.[7] .......................... C09D 11/10; C08L 67/00
(52) U.S. Cl. ........................ 523/160; 524/601; 524/609
(58) Field of Search ................................. 523/160, 161; 106/31.27, 31.57; 525/35, 41; 524/601, 604, 608, 609

(56) References Cited

U.S. PATENT DOCUMENTS

| | | | |
|---|---|---|---|
| 3,995,992 A | * 12/1976 | Defago et al. .................. 5/470 |
| 4,148,770 A | 4/1979 | Stahle et al. | |
| 4,148,779 A | 4/1979 | Blackwell et al. | |
| 4,153,467 A | * 5/1979 | Yano et al. .................. 347/100 |
| 4,531,976 A | * 7/1985 | Lin .......................... 106/31.35 |
| 4,680,332 A | 7/1987 | Hair et al. | |
| 4,692,188 A | * 9/1987 | Ober et al. .................. 523/300 |
| 4,771,035 A | * 9/1988 | Murata et al. ............... 503/227 |
| 4,804,719 A | 2/1989 | Weaver et al. | |
| 4,847,316 A | * 7/1989 | Schick et al. .................. 524/88 |
| 5,006,598 A | 4/1991 | Adams et al. | |
| 5,189,008 A | * 2/1993 | Murata et al. ............... 503/227 |
| 5,226,957 A | 7/1993 | Wickramanayake et al. | |
| 5,302,654 A | * 4/1994 | Ishii et al. .................. 524/458 |
| 5,336,714 A | 8/1994 | Krutak et al. | |
| 5,342,440 A | 8/1994 | Wickramanayake | |
| 5,446,082 A | * 8/1995 | Asai et al. .................. 524/389 |
| 5,531,816 A | 7/1996 | Wickramanayake | |
| 5,565,022 A | 10/1996 | Wickramamyake | |
| 5,614,008 A | 3/1997 | Escano et al. | |
| 5,665,151 A | 9/1997 | Escano et al. | |
| 5,837,754 A | 11/1998 | Shimomura et al. | |
| 5,888,253 A | * 3/1999 | Yamamoto et al. ............. 8/466 |

FOREIGN PATENT DOCUMENTS

| | | |
|---|---|---|
| EP | 0351328 | 1/1990 |
| EP | 0763577 | 3/1997 |
| FR | 2311820 | 12/1976 |
| JP | 7196965 | 8/1995 |
| WO | 9106608 | 5/1991 |
| WO | 9534024 | 12/1995 |
| WO | 9603467 | 2/1996 |
| WO | 9706217 | 2/1997 |

* cited by examiner

*Primary Examiner*—Vasu Jagannathan
*Assistant Examiner*—Callie E. Shosho
(74) *Attorney, Agent, or Firm*—Rothwell, Figg, Ernst & Manbeck

(57) ABSTRACT

An ink composition comprising water, a water-dissipatable polyester, a disperse dye or a solvent soluble dye or a mixture of such dyes, a water-immiscible organic solvent and a water miscible organic solvent. The inks are useful in ink jet printers.

14 Claims, No Drawings

AQUEOUS INK COMPOSITIONS

This invention relates to an ink jet printing process and to inks.

Inks containing water-soluble dyes, water and organic solvents are well known. For example Zeneca's British Patent application No. 2,275,479 describes such inks and their utility in ink jet printing ("IJP").

Inks containing a water-insoluble acrylic polymer and an oil soluble dye are described in U.S. Pat. No. 4,680,332. These inks are suitable for piezoelectric IJP but when they are used in thermal IJP they tend to block printer nozzles giving poor quality images which have a "quilted" appearance.

WO91/06608 describes aqueous inks containing a polyester, water, a pigment and a wax. Whilst these inks are useful in printing presses, the pigments they contain require intensive and expensive milling to make them fine enough to pass through ink jet printer heads and the pigments have a tendency to settle out from the ink on standing for long periods. Furthermore, images formed from inks containing insoluble pigments are generally opaque and this limits their usefulness on overhead projector slides.

WO95/34024 describes a process for preparing an optical filter comprising a coloured cross-linked polymeric coating on a transparent substrate.

There is a need for inks which are suitable for thermal IJP, have high colour strength and give clear, high water-fast images with high light fastness when printed on a substrate.

According to the present invention there is provided an ink composition comprising water, a water-dissipatable polyester, a disperse dye or a solvent soluble dye or a mixture of such dyes, a water-immiscible organic solvent and a water miscible organic solvent.

The Water-Dissipatable Polyester

The water-dissipatable polyester may be prepared using conventional polymerisation procedures known to be effective for polyester synthesis. Thus, it is well known that polyesters contain carbonyloxy (i.e. —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g. carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris(hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

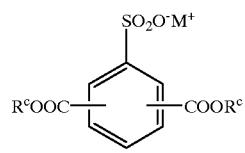

wherein M is a cation (preferably sodium, lithium or potassium); and each $R^c$ independently is H, a cation or $C_{1-4}$-alkyl (preferably methyl or ethyl). Preferred compounds of the above formula are of formula:

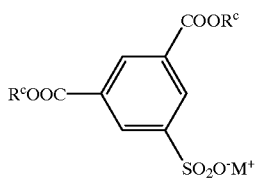

wherein M and $R^c$ are as defined above. Particularly preferred is the mono sodium salt (one $R^c$ is H, the other is Na), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

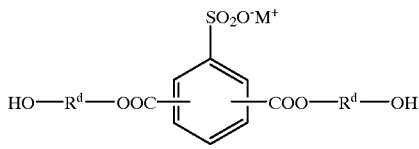

wherein M is as hereinbefore defined above and each $R^d$ independently is alkylene, preferably $C_{2-4}$-alkylene. Preferred compounds of the above formula are:

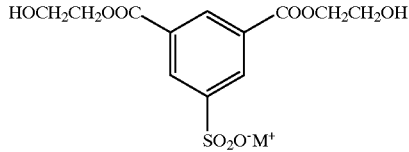

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g. an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although F substituents would increase acid strength), with alkali metal ions such as $Na^+$, $Li^+$ and $K^+$ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

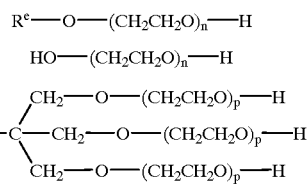

wherein $R^e$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1000 to 25,000, especially 2000 to 20,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

In an alternative embodiment the Mn is up to 10000, up to 3000 or up to 2000. The minimum value for Mn in these embodiments is 500 or 750. For example Mn is in the range from 500 to 2500 or 750 to 2500 or 750 to 2100.

The water-dissipatable polyester preferably has a hydroxyl number of from 0 to 225 mg KOH/g, more preferably 0 to 125 mg KOH/g, especially from 0 to 50 mgKOH/g. In an alternative embodiment the hydroxyl number is from 20 to 350 mg KOH/g or 20 to 200 mg KOH/g.

The ink preferably has a pH or 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range $-38°$ C. to $105°$ C., more preferably $-20$ to $70°$ C., especially $-10°$ C. to $60°$ C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

Water-dissipatable polyesters can also be purchased from Eastman Kodak Company and Zeneca Limited. Examples include Eastman AQ29D and AQ55W.

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth)acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

Alternatively polyesters used in this invention which have unsaturated linkages incorporated into their structures may also be mixed with ultra-violet curable monomers and oligomers such that the polyester will cross-link on exposure to ultra-violet radiation. These monomers and oligomers are known in the art and include compounds such as (meth) acrylates of polyhydric alcohols, (meth)acrylates of polyhydric alcohol glycidyl ethers, (meth)acrylates of polyethylene glycols, (meth)acrylates of addition products of polyhydric alcohols and ethylene oxide and reaction products of a polybasic add anhydride and a hydroxyl group-containing (meth)acrylic ester. A photopolymerisation initiator is used and this may be selected from, for example, azides, ketone such as acetophenone or benzophenone and their derivatives, ketals such as benzyl dimethyl ketal, peroxides such as benzoyl peroxide, benzoin, benzoin ethers, acyl phosphine oxides or aryl sulphonium salts such as diphenyl-(4-phenylthio)-phenyl sulphoniumtetrafluorophosphate. One or more photopolymerisation initiators may be used, optionally with a sensitising agent. Suitable sensitising agents include aminobenzoates, alkanolamines and substituted thioxanthones.

Additionally the polyester used in this invention which contain unsaturated linkages may be cross-linked by electron beam radiation without the need for additional cross-linking monomers/oligomers and initiators. Cross-linking substantially improves the chemical and thermal resistance of the polyester and is desirable in the preparation of LCD colour filters.

The Dyes

The mixture of dyes may be a mixture of disperse dyes, a mixture of solvent soluble dyes or a mixture of one or more disperse dyes with one or more solvent soluble dyes.

The disperse or solvent-soluble dye is preferably a water-insoluble dye which is soluble or dispersible in the mixture of the water-miscible solvent, water-immiscible solvent and water-dissipatable polyester. Disperse and solvent soluble dyes are distinct from pigments in that pigments are insoluble in organic solvents and polyesters whereas disperse and solvent soluble dyes are soluble in organic solvents. Useful classes of disperse and solvent soluble dyes include water-insoluble anthraquinones, phthalocyanines, pyrrolines, triphenodioxazines, methines, benzodifuranones, coumarins, indoanilines, benzenoids, xanthenes, phenazines, solvent soluble sulphur dyes, quinophthalones, pyridones, aminopyrazoles, pyrollidines, styrylics and azoics. Examples of preferred azoics are monoazo, disazo and trisazo disperse each of which are optionally metallised and solvent soluble dyes; especially preferred azoics contain heterocyclic groups. The Colour Index International lists suitable disperse and solvent soluble dyes, examples of which include Solvent Blue 63, Disperse Blue 24, Solvent Black 3, Solvent Black 35 and Disperse Red 60.

Further examples of disperse dyes are given in the Colour Index, 3rd Edition, Volume 2, pages 2483 to 2741 and further examples of solvent soluble dyes are given in Volume 3, pages 3566 to 3647 and each of these dyes is included herein by reference Preferred dyes for use in the present invention include:

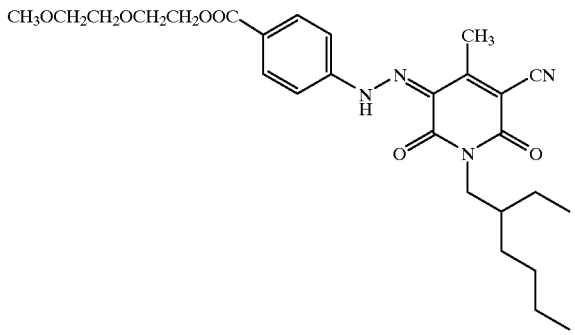

The Inks

The ink compositions preferably exist as a solution, emulsion, micro-emulsion, dispersion or micelle.

Preparation of The Inks

The present ink compositions may be prepared by dissolving the dye in a mixture of an organic solvent, preferably a water-immiscible organic solvent (e.g. benzyl alcohol) and water miscible organic solvent(s), and adding this solution to a solution of the water-dissipatable resin in water and mixing, e.g. by stirring or sonication. The inks may be prepared at any temperature, for example between 5 and 85° C., preferably at a temperature from 15 to 30° C.

The water-dissipatable polyester may also be dyed by heating a water-dissipatable polyester and a disperse dye or solvent soluble dye at an elevated temperature, for example at a temperature in the range 35 to 150° C., preferably from 40 to 90° C. This dyeing may be performed on the solid polyester or a solution of the polyester in water and/or an organic solvent. Alternatively, the solid water-dissipatable polyester resin and the disperse or solvent soluble dye are dissolved in an organic solvent and the solvent is removed by evaporation. This gives a clear, intensely coloured polyester which may then be diluted with water, a water-miscible solvent and an organic solvent to give an ink.

A particularly useful process for the preparation of an ink according to the invention comprises step a) and optionally step b) wherein: step a) comprises mixing together:
(i) a solution of a disperse dye or a solvent soluble dye or a mixture of such dyes in a water-immiscible organic solvent; and
(ii) a water-dissipatable polyester, optionally in water; step b) comprises mixing the product of step a) with water; provided that either or both of (i) and (ii) further contains a water-miscible organic solvent.

As inks of the invention contain water, step b) will usually be necessary when component (ii) does not contain water. If desired step b) may be performed even if water is present from step a). The mixing together referred to in step a) is of components (i) and (ii).

The above process leads to a particularly good up-take of dye by the polyester to give intensely coloured inks.

Water-Immiscible Organic Solvents

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Water-Miscible Organic Solvents

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Preferred Ink Formulations

The ratio of water-miscible organic solvent to water-immiscible organic solvent is preferably 19:1 to 1:1, more preferably 8:1 to 1:1, especially 5:1 to 1:1.

The amount of said dye(s) and water-dissipatable polyester contained in the ink will vary according to the depth of shade required. Typically, however, the ink will comprise
(a) from 0.1 to 20 parts, more preferably 0.5 to 10 parts, especially 0.5 to 2.0 parts of said dye(s);
(b) from 0.5 to 50 parts, more preferably 2 to 20 parts, especially 8 to 12 parts of a water-dissipatable polyester,
(c) from 40 to 90 parts, more preferably from 50 to 80 parts of water;

(d) from 2 to 30 parts, more preferably 5 to 15 parts, especially from 8 to 12 parts of a water-immiscible organic solvent; and (e) from 2 to 60 parts, more preferably from 5 to 25 parts, especially from 10 to 20 parts of a water-miscible organic solvent;

wherein all parts are by weight and the total number of parts of (a)+(b)+(c)+(d)+(e) add up to 100.

The number of parts of the water-dissipatable polyester is calculated on a 100% solids basis. For example 50 g of a 20% solids polyester is taken as 10 g of polyester.

The preferred water-immiscible solvent is an alcohol having at least six carbon atoms, especially benzyl alcohol.

The water-miscible solvent is preferably:

(a) a cyclic ester or cyclic amide (especially an optionally substituted pyrrolidone);

(b) a water-miscible $C_{1-6}$-alkyl mono ether of a $C_{2-6}$-alkylene glycol or $C_{1-6}$-alkyl mono ether of poly($C_{2-6}$-alkylene glycol); or (c) a mixture of (a) and (b).

The ink compositions preferably comprise from 0.5 to 50%, more preferably from 2 to 20% and especially from 8 to 12% of the water-dissipatable polyester; from 0.5 to 20%, more preferably from 0.5 to 10% and especially from 0.5 to 2.0% of the disperse or solvent soluble dye or combination thereof; from 2 to 30%, more preferably from 5 to 15% and especially from 8 to 12% of the water-immiscible organic solvent; from 2 to 60%, more preferably from 5 to 25% and especially from 10 to 20% of the water-miscible solvent with substantially the rest of the ink composition being water provided that at least 30% of the ink composition is water. All percentages are %w/w (i.e. by weight).

An especially preferred ink composition comprises from 0.5 to 5.0% of disperse or solvent soluble dye or mixture thereof, from 5 to 30% of water immiscible solvent, from 5 to 30% of sulphonated polyester resin, from 0.1 to 30% of water miscible solvent, optionally from 0.1 to 2% of an organic base (e.g. such as morpholine or its derivatives or an alkanolamine) with the remainder of the composition comprising substantially water.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones are 2-pyrrolidone, dimethyl pyrrolidone N-methyl-2-pyrrolidone, N-ethyl-2-pyrrolidone and N-(2-hydroxyethyl)-2-pyrrolidone and mixtures thereof.

The inks optionally contain a biocide, for example Proxel GXL (Proxel is a trade mark of Zeneca Limited) or Kathon (Kathon is a trade mark of Rohm and Haas), a fungicide, a rheological agent, e.g. a wax (e.g. beeswax), a clay (e.g. bentonite), an IR absorber, for example Projet 900NP(Projet is a trade mark of Zeneca Limited), a fluorescent brightener, for example C. I. Fluorescent Brightner 179 and/or UV absorber, for example hydroxy phenylbenzotriazole. Furthermore the ink compositions optionally contain a surface active agent, wetting agent and/or emulsifiers, for example those described in McCutcheon's Emulsifiers and Detergents 1996 International Edition or in Surfactants Europa 3rd Edition 1996 each of which is incorporated herein by reference.

Inks according to the invention have an advantage over inks containing pigments in that less dye is usually required than would be the case for a pigment, expensive milling is avoided, the inks are less likely to form a precipitate on standing, a far greater variety of shades are available and the resultant prints have good transparency. The latter quality is particularly important for the production of coloured substrates which require transparency, for example over-head projector slides and colour filters used in LCD television screens. The inks of the present invention also benefit from good light- and water-fastness.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

Printing Process

According to a further feature the present invention provides a process for the coloration of a substrate comprising printing an ink onto the substrate using an ink jet printer, characterised in that the ink is as hereinbefore defined in relation to the present invention.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, a transparent material (e.g. an overhead projector slide) or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

Optical Filters

The inks of the present invention may also be used for the preparation of colour filters, for example those used in flat bed displays.

According to a further feature of the present invention, there is provided a process for preparing an optical filter comprising applying to a transparent substrate, an ink according to the invention thereby forming a coloured cross-linked polymeric coating on the substrate. Preferably the process comprises applying a red, green and blue ink according to the invention. The red, green and blue inks are preferably applied as discrete filler regions, preferably in triads.

The ink used to prepare the optical filter preferably contains a polymer precursor, for example one or more of the olefinically unsaturated monomers mentioned above and an initiator. Dyes contained in the inks may contain one or more substituents such as hydroxy, carboxylic acid, acid anhydride, amine, substituted amine, alkene and epoxide which are capable of forming a covalent bond with the polymer precursor and thereby further improve the chemical and thermal resistance of the coating.

The cross-linked polymeric coating may be formed on a substrate to which the ink will bond, adhere, absorb or fuse. Suitable transparent substrates include glass; plastics films and plates such as those of polyvinylalcohol, polyester, polyvinylchloride, polyvinylfluoride, polycarbonate, polystyrene, polyamide or polyimide. A preferred substrate is glass.

The substrates may be pre-treated to improve bonding, adhesion, absorption, fusion or spreading of the cross-linked polymeric coating on the substrate. Suitable pre-treatments include plasma ashing in which the substrate is placed in an oxygen atmosphere and subjected to an electrical discharge or application of an adhesion promoter such as a silane.

In the present process the cross-linking of the ink may be initiated thermally, chemically or photochemically. Similarly any reaction between the polymer precursor(s) and dye(s) may be initiated thermally, chemically or photochemically. The reaction between polymer precursor(s) and dye(s) in the inks may, where they are sufficiently reactive, be initiated simply by mixing the polymer precursor(s) and inks each optionally in a liquid medium and allowing the mixture to air dry.

Where the polymer precursor used in processes for forming an optical filter is one which is itself capable of cross-linking when cured (e.g. melamine-formaldehyde resin condensate) no additional cross-linking agent need be added to the mixture of the ink and polymer precursor. However, where the polymer precursor is one which is not itself capable of extensive cross-linking, it may be desirable to add a cross-linking agent to the mixture of ink and polymer precursor. The use of cross-linking agents is well known in the polymer art, and the choice of cross-linking agent will be readily made by one skilled in the art.

Chemical initiation may be achieved by the addition of suitable reactive agents such as epoxides, acids or acid anhydrides.

Photochemical initiation for polyesters having unsaturated linkages incorporated into their structure may be achieved by electron beam radiation or by the addition of ultra violet curing monomers and oligomers and initiators, for example azides, ketone such as acetophenone or benzophenone and their derivatives, ketals such as benzyl dimethyl ketal, peroxides such as benzoyl peroxide, benzoin, benzoin ethers, acyl phosphine oxides or aryl sulphonium salts such as diphenyl-(4-phenylthio)-phenyl sulphoniumtetrafluorophosphate followed by irradiation with UV or visible light.

Thermally initiated cross-linking and reaction is preferred because it has the advantage of simplicity.

The ink is preferably applied to the transparent substrate by a printing process, for example by a printing process such as flexographic, off-set lithographic, gravure, intaglio, ink-jet, dye diffusion thermal transfer and screen printing processes. The printing process is preferably ink-jet printing, especially thermal or piezoelectric ink-jet printing. The principles and procedures for ink jet printing are described in the literature for example in High Technology Applications of Organic Colorants, P. Gregory, Chapter 9 ISBN 0-306-43637-X.

Optical filters, alternatively known as colour filters, are used in liquid crystal displays, for example in small television receivers.

Where the process used for applying the ink to the transparent substrate is ink jet printing, it is possible to achieve printing of all three primary colours (red, green and blue) simultaneously to form triads or any desired groupings of filter elements, for example by using a printing head having outlets for three coloured inks of the invention.

Ink Jet Printing of Textiles

According to a further aspect of the present invention there is provided a process for the coloration of a synthetic textile material with an ink according to the invention which comprises the steps:

(i) applying the ink composition to the textile material by ink jet printing; and (ii) heating the printed textile material at a temperature from 50° C. to 250° C. to fix the dye on the material.

The application of the ink composition to the textile material, stage (i) of the present process, is preferably effected by drop on demand (DOD) or continuous flow ink jet printing. Where the ink jet printing technique involves the charging and electrically-controlled deflection of drops the ink preferably also contains a electrically-conducting material, e.g. an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material. This has been found to minimise the diffusion of the dye from printed to non-printed regions. Removal of water is preferably by heat, such as by exposure to hot air or to infra-red or micro-wave radiation.

In stage (ii) of the present process, the printed textile material is preferably submitted to a short heat treatment, preferably after removal of water by low-temperature drying, at a temperature from 100° C. to 200° C. For a period of up to 20 minutes. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the dye compositions may be removed from the textile material by a washing sequence, involving a series of hot and cold washes in water and aqueous detergent solutions before the textile material is dried.

According to a further aspect of the present invention there is provided a textile material, especially a synthetic textile material or a blend of synthetic textile material with cellulosic material, coloured with any of the ink compositions according to the present invention or by means of a process according to the present invention.

Transfer Printing

According to a further aspect of the present invention there is provided a transfer printing sheet for synthetic textile materials comprising a substrate and a coating comprising a water-dissipatable polyester and a disperse or a solvent soluble dye or a mixture of such dyes, characterised in that the coating has been applied to the sheet using an ink according to the invention, preferably by ink jet printing.

A preferred transfer printing process comprises the steps:

(i) applying an ink according to the invention to a first substrate thereby resulting in a first substrate carrying an image;

(ii) bringing the image resulting from step (i) into contact with a second substrate;

(iii) heating the first substrate thereby transferring the image to the second substrate.

This latter process can be used to prepare T-shirts, clothing and novelty goods in general.

The heating in step (iii) is preferably at a temperature of from 60 to 250° C., more preferably from 150 to 220° C. The period of heating is preferably from 1 to 45 seconds, more preferably from 5 to 30 seconds. Consequently the first substrate is preferably capable of withstanding these temperatures for the times indicated.

The first substrate is preferably selected from paper and foil, for example aluminium foil.

The invention is further illustrated by the following examples in which all parts and percentages are by weight unless specified otherwise.

EXAMPLE 1

Stage 1—Preparation of a Water-Dissipatable Polyester

To a glass reactor fited with distillation column and condenser were charged ingredients A, B, D, F, G and 50% of C and 50% of H. The contents were heated with stirring to a reaction temperature of 210° C. until the mixture was clear and the acid value was <10 mgKOH/g. At this point E and the remainder of C and H were charged and the temperature raised to 230° C. The reaction was continued under reduced pressure until an acid value of 5.3 mgKOH/g was obtained. The resin was further characterised by a hydroxyl value=27.6 mgKOHg, ICI Cone and Plate viscosity @ 125° C.=80 poises and a Tg (onset)=25.4° C. and a number average molecular weight by end group analysis of approximately 2000. The resin was readily dispersed in warm distilled water to give a clear solution having a solids content of 20% w/w.

| Monomer | Abbreviation | Weight (g) |
|---|---|---|
| neopentyl glycol | A | 206.25 |
| diethylene glycol | B | 82.5 |
| isophthalic acid | C | 300 |
| sodio-5-sulpho-isophthalic acid | D | 75 |
| adipic acid | E | 37.5 |
| methoxy PEG 750 | F | 75 |
| sodium acetate | G | 1.5 |
| Fascat 4101 | H | 0.75 |

Stage 2—Ink Preparation

A sample of CI Disperse Yellow 126 (from BASF, Dispersol Yellow D-7G) (1 g) was dissolved in a mixture of benzyl alcohol (10 g) and 2-pyrrolidone (20 g) using a sonicator. A mixture of the water-dissipatable polyester described in Stage 1 (50 g, 20% w/w solution in water) and water (19 g) was added and the mixture was shaken to give a homogenous ink having the formulation:

| Component | Amount (g) |
|---|---|
| CI Disperse Yellow 126 | 1 |
| Polyester from Stage 1 | 50 (20% solids) |
| Benzyl alcohol (Immiscible) | 10 |
| 2-pyrrollidone (Miscible) | 20 |
| Water | 19 |
| | 100 |

Stage 3—Ink Jet Printing Using the Inks

The ink described in Stage 2 was printed onto 2 commercially available plain papers, as described below, using a Hewlett Packard thermal ink-jet printer.

The resultant prints had very good colour strength and brightness (chroma) as indicated in Table 1 and showed very high water fastness. 0.5 ml of water run down a test print only 5 minutes after printing produced virtually no stain on the white paper.

The prints were irradiated with light using an Atlas Ci 35 weatherometer and the colour change (ΔE) measured after the time indicated in Table 1.

Paper XA is Xerox 4024 from Rank Xerox

Paper WC is Conqueror High White Wove 100 g/m² from Arjo Wiggins Limited.

ROD is the reflected optical density of the resultant print.

TABLE 1

| Paper | ROD | Chroma | ΔE |
|---|---|---|---|
| XA | 0.84 | 78.03 | 7.59 @ 24 hours |
| | | | 11.01 @ 48 hours |
| | | | 13.55 @ 72 hours |
| | | | 14.09 @ 100 hours |
| WC | 0.82 | 86.49 | 5.83 @ 24 hours |
| | | | 9.55 @ 48 hours |
| | | | 10.29 @ 72 hours |
| | | | 12.09 @ 100 hours |

EXAMPLE 2

Stage 1—Dyeing of Water Dissipatable Polyester

C.I. Disperse Yellow 126 (from BASF) (1.2 g) was mixed with 60 g of a 20% w/w aqueous solution of the polyester described in Example 1, Stage 1 and heated with stirring at 80–90° C. for 30 minutes. The resultant dyed resin dispersion was cooled and filtered through a 0.45 μm membrane filter.

Stage 2—Ink Preparation 1.25 g of the dispersion from Stage 1 was mixed with benzyl alcohol (0.5 g), thiodiglycol (0.75 g) and of distilled water (2.5 g) to give the following ink:

| Dyed resin dispersion from Stage 1 | 1.25 g (20% solids) |
|---|---|
| Benzyl alcohol (immiscible) | 0.5 g |
| Thiodiglycol (miscible) | 0.75 g |
| Water | 2.5 g |
| | 5.0 g |

Stage 3—Ink Jet Printing Using the Ink

The ink described in Stage 2 was printed onto 2 commercially available papers as described below using a Hewlett Packard HP 560C thermal ink-jet printer.

a) Gilbert Bond—plain paper from The Mead Corporation b) HP Coated Ink Jet Printer paper Ref HP 51634Y from Hewlett Packard.

The ink fired very well with respect to the absence of nozzle blockage and continued firing over a period of time. The ink spread well on the paper surface to give a homogenous print. Furthermore the ink had no tendency to penetrate the bulk of the paper. Consequently ink "strike through" was very good.

EXAMPLES 3 AND 4

Further inks were prepared using the method of Example 2, Stage 2, with lower levels of benzyl alcohol as follows:

| | Ex 3 | Ex 2 |
|---|---|---|
| Dyed Resin Dispersion from Example 2, Stage 1 | 1.25 g | 1.25 g |
| Thiodiglycol | 0.75 g | 0.75 g |
| Benzyl Alcohol | 0.3 g | 0.15 g |
| Water | 2.70 g | 2.85 g |
| | 5.00 g | 5.00 g |

The printing performance of these inks was very similar to that from Example 2.

Comparative Example 1

The ink preparation from Example 2, Stage 2 was repeated except that the immiscible solvent (benzyl alcohol) was replaced by water to give an ink as follow:

| | |
|---|---|
| Dyed Resin Dispersion from Example 2, Stage 1 | 1.25 g |
| Thiodiglycol | 0.75 g |
| Water | 3.00 g |
| | 5.00 g |

This ink was printed as described in Example 2, Stage 3 and caused severe firing problems. Not all the nozzles could be made to fire at once and those that did fire blocked up quickly. The ink also showed poor spreading performance on the paper such that the individual drops could be seen and solid blocks of print could not be generated.

Examples 5–9 and Comparative Examples 2 and 3

In Examples 5–9 and comparative Examples 2 and 3 the following ink formulation was used, only the types of miscible and immiscible solvents were varied.

| | |
|---|---|
| Dispersol Yellow D-7G (from BASF) | 1% |
| Morpholine | 1% |
| Water-Immiscible Solvent A | 10% |
| Water-Miscible Solvent B | 20% |
| 20% w/w aqueous polyester from Example 1, Stage 1 | 50% |
| water | 18% |

In all cases the dye, morpholine and solvents were mixed together and placed in a sonic bath until all the dye had dissolved. The resin solution and water were then added and the mixture shaken to give a homogenous ink.

The inks were fired through a Hewlett Packard HP 560C printer onto Xerox 4024 plain paper and the reflected optical density (ROD) and print brightness (chroma) measured. The solvents used and results are shown in Table 2 below:

TABLE 2

| Example | Solvent A | Solvent B | ROD | Chroma |
|---|---|---|---|---|
| 5 | Benzyl alcohol | 2-P* | 0.745 | 73.45 |
| 6 | Benzyl alcohol | NMP* | 0.725 | 76.43 |
| 7 | EG-MS | 2-P* | 0.733 | 78.79 |
| 8 | Benzyl alcohol | DEG-MME* | 0.696 | 77.85 |
| 9 | Benzyl alcohol | 1:1, DEG-MBE*:2-P* | 0.698 | 77.61 |
| Comp. 2 | DEG* | NMP* | 0.375 | 45.23 |
| Comp. 3 | DEG-MBE* | NMP* | 0.401 | 47.97 |

*a water-miscible organic solvent.
EG-MS is ethylene glycol mono salicylate
NMP is n-methyl-2-pyrrolidone
DEG-MME is diethylene glycol monomethyl ether
DEG-MBE is diethylene glycolmonobutyl ether
DEG is diethylene glycol
2-P is 2-pyrrolidone.

As can be seen from Table 2, comparative Examples 2 and 3 gave lower optical density and chroma than Examples 5 to 9.

EXAMPLES 10–12

A sample of Methic Turquoise P Base (from Zeneca Limited) (1 g) was mixed with benzyl alcohol (10 g), one or more water miscible solvents as described below (20 g) and morpholine (1 g). This mixture was then placed in a sonic bath until all the dye had dissolved. 50 g of a 20% aqueous solution of the polyester described in Example 1, Stage 1 and water (18 g) were then mixed with the dye solution and shaken to give a homogenous ink.

These inks were then printed onto Conqueror High White Wove 100 gsm paper using a Hewlett Packard HP 560C thermal ink jet printer.

The results described in Table 3 were obtained.

TABLE 3

| Example | Solvent | ROD |
|---|---|---|
| 10 | 2-P | 0.773 |
| 11 | 1:1, 2-P: DEG-MME | 0.800 |
| 12 | 1:1, 2-P: DEG-MBE | 0.814 |

Abbreviations as for Table 2.

EXAMPLES 13–15

The ink formulations described in Table 4 were prepared in the same manner as those in Examples 10–12:

TABLE 4

| | Example | | |
|---|---|---|---|
| Component | 13 | 14 | 15 |
| Methic Turquoise P | 1% | 1% | 1% |
| Morpholine | 1% | 1% | 1% |
| Benzyl Alcohol - Immiscible Solvent | 10% | 10% | 10% |
| Ethylene glycol mono salicyate - Immiscible Solvent | 5% | | |
| Diethylene glycol monobutyl ether - Miscible Solvent | 5% | 10% | 10% |
| 2-pyrrolidone - Miscible Solvent | 10% | 5% | 5% |
| Oxazolidone - Miscible Solvent | | 5% | |
| Imidazolidone - Miscible Solvent | | | 5% |
| 20% aqueous polyester from Example 1, Stage 1 | 50% | 50% | 50% |
| water | 18% | 18% | 18% |

The above inks were then printed onto the various plain papers using the Hewlett Packard HP 560C thermal ink jet printer and the ROD were as described in Table 5 below:

TABLE 5

| Example | Xerox 4025 Paper | Gilbert bond Paper | Conqueror Paper |
|---|---|---|---|
| 13 | — | — | 0.786 |
| 14 | 0.752 | 0.700 | 0.759 |
| 15 | 0.778 | 0.726 | 0.781 |

EXAMPLE 16

A sample of Lampranol Red 2BRN (C.I.Solvent Red 160) (from Zeneca Limited) (1 g) was mixed with ethylene glycol mono salicylate (immiscible solvent) (5 g), hexylene glycol (5 g) (miscible solvent), N-methyl-2-pyrrolidone (20 g) (miscible solvent) and morpholine (1 g). The mixture was held in a sonic batch until all the dye had dissolved. 50 g of a 20% w/w aqueous solution of the polyester described in Example 1, Stage 1 and water (18 g) were then added and the mixture shaken to give a homogenous and stable ink.

The ink was fired through a Hewlett Packard HP560C printer onto Adjo Wiggins Conqueror paper. The resultant print had reflected optical density of 0.67.

EXAMPLES 17–18

Inks of the formulations described in Table 6 were prepared in the same manner as those described in Examples 10–16.

TABLE 6

| Component | Example 17 | Example 18 |
|---|---|---|
| Neozapon Pink 478 (C.I. Solvent Red 127) ex BASF | 2 g | 2 g |
| 20% w/w aqueous polyester from Example 1, Stage 1 | 50 g | 50 g |
| Morpholine | 1 g | 1 g |
| Benzyl alcohol (immiscible solvent) | 10 g | — |
| Ethylene glycol mono salicylate (immiscible) | — | 5 g |
| Hexylene glycol (miscible) | — | 5 g |
| 2-pyrrolidone (miscible) | 20 g | 20 g |
| Water | 17 g | 17 g |

These inks were printed onto the plain paper using the Hewlett Packard HP560C printer and the resultant ROD are as shown in Table 7 below:

TABLE 7

| Example | ROD |
|---|---|
| 17 | 1.134 |
| 18 | 1.025 |

EXAMPLES 19–21
Stage 1—Preparation of a Water-Dissipatible Polyester

To a glass reactor fitted with distillation column and condenser were charged ingredients A, B, C, E, G, H and 50% of D and 50% of I. The contents were heated with stirring to a reaction temperature of 210° C. until the mixture was clear and the acid value was <10 mgKOH/g. At this point F and the remainder of D and I were charged and the temperature raised to 230° C. The reaction was continued under reduced pressure until an acid value of 2.8 mgKOH/g was obtained. The resin was further characterised by a hydroxyl value=19.7 mgKOHg, ICI Cone and Plate viscosity @ 125° C.=90 poises and a Tg (onset)=4° C. The number average molecular weight by end group analysis was 4987. The resin readily dispersed in warm distilled water to give a clear solution having a solids content of 20% w/w.

TABLE 8

| Monomer | Abbreviation | Weight (g) |
|---|---|---|
| neopentyl glycol | A | 15 |
| hexane-1,6-diol | B | 10 |
| diethylene glycol | C | 10 |
| isophthalic acid | D | 40 |
| sodio-5-sulpho-isophthalic acid | E | 10 |
| adipic acid | F | 5 |
| methoxy PEG 750 | G | 10 |
| sodium acetate | H | 0.2 |
| Fascat 4101 | I | 0.1 |

Stage 2—Ink Preparation and Printing

Inks of the following formulations were prepared in the same manner as for Examples 13–15.

TABLE 9

| Component | Ex 19 | Ex 20 | Ex 21 |
|---|---|---|---|
| C.I. Solvent Orange 2 | 1 g | | |
| C.I. Disperse Orange 13 | | 1 g | |
| C.I. Disperse Orange 3 | | | 1 g |
| Benzyl Alcohol | 10 g | 10 g | 10 g |
| 2-Pyrrolidone | 20 g | 20 g | 20 g |

TABLE 9-continued

| Component | Ex 19 | Ex 20 | Ex 21 |
|---|---|---|---|
| 20% w/w aqueous solution of polyester from Stage 1 | 50 g | 50 g | 50 g |
| Water | 19 g | 19 g | 19 g |

These inks were then used to fill empty colour cartridges from an Olivetti JP450 ink jet printer. This printer was then used to print the inks on the following papers and the ROD measured.

Papers
  Xerox 4024
  Wiggins Conqueror High White Wove 100 gsm
ROD Measurements

TABLE 10

| Example | Xerox 4024 Paper | Conqueror Paper |
|---|---|---|
| 19 | 0.70 | 0.83 |
| 20 | 0.92 | 1.01 |
| 21 | 0.91 | 0.98 |

EXAMPLES 22–24
Stage 1—Preparation of a Water-Dissipatible Polyester

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mgKOH/g was obtained. The resin was further characterised by a hydroxyl value=3.4 mgKOHg, ICI Cone and Plate Viscosity @ 125° C.=>500 poises and a Tg (onset)=18° C. The number average molecular weight by end group analysis was 8766. The resin was readily dispersed in warm distilled water to give a clear solution having a solids content of 20% w/w.

TABLE 11

| Monomer | Abbreviation | Weight (g) |
|---|---|---|
| neopentyl glycol | A | 15 |
| diethylene glycol | B | 10 |
| isophthalic acid | C | 45 |
| sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

Stage 2—Ink Preparation and Printing

The following inks were prepared in the same manner as for Examples 13–15.

TABLE 12

| Component | Ex 22 | Ex 23 | Ex 24 |
|---|---|---|---|
| Celestine Blue (from Aldrich) | 1 g | | |
| C.I Basic Blue 41 | | 1 g | |
| Pro-jet Black Alc. Powder (from Zeneca Limited) | | | 3 g |
| Benzyl Alcohol | 10 g | 10 g | 10 g |

TABLE 12-continued

| Component | Ex 22 | Ex 23 | Ex 24 |
|---|---|---|---|
| 2-pyrrolidone | 20 g | 20 g | 20 g |
| 20% w/w aqueous solution of polyester from stage 1 | 50 g | 50 g | 50 g |
| Water | 19 g | 19 g | 17 g |

These inks were printed onto plain paper using a Olivetti JP450 printer as described in Examples 19–21 and the ROD measurements were as follows:

| Example | Xerox 4024 Paper | Conqueror Paper |
|---|---|---|
| 22 | 0.51 | — |
| 23 | 0.75 | — |
| 24 | 1.03 | 1.07 |

EXAMPLES 25–28

A dye of the formula shown below:

Dye 1

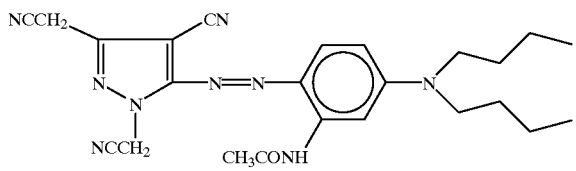

was prepared by using stages 1a to 1d described below.

Stage 1a

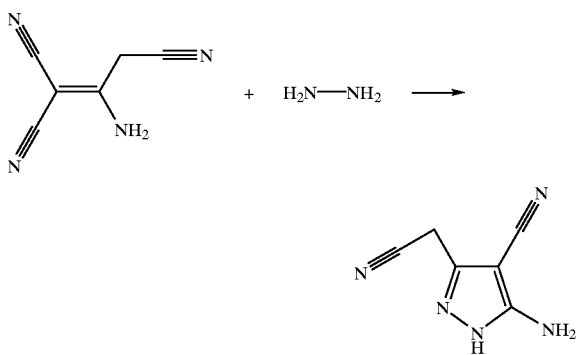

2-Amino-1,1,3-tricyanopropene (66 g) was suspended in ethanol (500 ml) at 5° C. A solution of hydrazine hydrate (25 ml) in water (25 ml) was then added dropwise over 30 mins at 5–10° C. After heating under reflux for 30 mins the reaction mixture was cooled to room temperature and the crystalline product was isolated by filtration, washed well with water and dried.

Stage 1b—3-(N,N-dibutylamino)acetanilide

3-Aminoacetanilide (186.2 g), 1-bromobutane (425 g), triethylamine (3/4 g) and ethanol (1 litre) were heated under reflux for 64 hrs. After cooling to room temperature the reaction mixture was filtered to remove triethylamine hydrochloride and the solvent evaporated under reduced pressure to leave to a dark oil which was purified by chromatography on silica gel. The product was crystallised by trituration under hexane.

Stage 1c—Preparation of

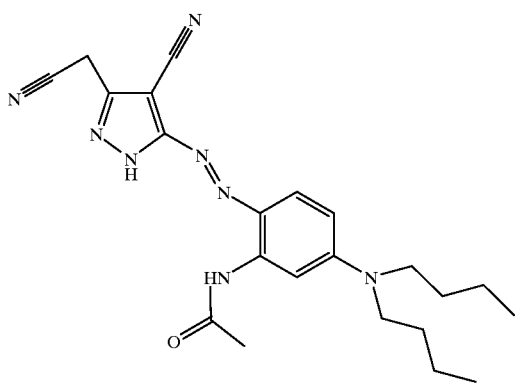

The product from Stage 1a (14.72 g) was suspended in a mixture of acetic acid (400 ml) and hydrochloric acid (60 ml) at 0–5° C. A solution of sodium nitrite (8 g) in the minimum of water was then added over 20 minutes. On completion of the addition the solution was stirred for a further 30 minutes and the excess nitrous acid destroyed by the addition of saturated sulphamic acid solution. The resultant diazonium salt solution was then added slowly to a solution the product from Stage 1b (26.4 g) in ethanol (500 ml) to which potassium acetate (50 g) had been added. After stirring for a further 60 minutes, water (800 ml) was added, and the product was isolated by filtration, washed well with water and dried.

Stage 1d—Preparation of Dye 1

The product from Stage 1c (21 g), chloroacetonitrile (5 ml), 2-butanone (250 ml), water (50 ml) and sodium hydrogen carbonate (4.2 g) were stirred and heated under reflux for 4 hrs. After diluting with water (1 litre) the crude product was isolated by extracting into dichloromethane and purified by column chromatography on silica gel eluting with ethyl acetate/hexane (1:1) to give Dye 1 as a red crystalline solid.

Stage 2—Ink Preparation

Inks of the following general formulation were prepared in the same manner as for Examples 13–15:

| | |
|---|---|
| Dye from Stage 1 | 1 g |
| Immiscible solvent A | 10 g |
| 2-Pyrrolidone (Solvent B) | 20 g |
| 20% w/w aqueous solution of polyester from Ex 22 Stage 1 | 50 g |
| Water | 19 g |

The following immiscible solvents under the heading 'Solvent A' were evaluated in the above formulation and all gave stable inks. With the exception of Example 29 all the inks were printed onto Xerox 4024 and Conqueror paper using a Hewlett Packard HP 560C ink jet printer. The inks gave good quality prints and the ROD was measured and recorded.

TABLE 13

| Example | Solvent A | Solvent B | ROD Xerox 4024 | ROD - Conqueror |
|---|---|---|---|---|
| 25 | 3-phenyl-1-propanol | 2-P | 0.87 | 0.8 |
| 26 | 4-methoxybenzyl alcohol | 2-P | 0.94 | 0.91 |

TABLE 13-continued

| Example | Solvent A | Solvent B | ROD Xerox 4024 | ROD - Conqueror |
|---|---|---|---|---|
| 27 | Ethyleneglycol mono salicylate | 2-P | 0.94 | 0.87 |
| 28 | Diethyl glycol mono hexyl ether | 2-P | 0.98 | 0.99 |
| 29 | Dichloromethane | 2-P | — | — |

Comparative Examples 4–5

Inks of the formulation described in Examples 25–28 were prepared in which the immiscible solvent (Solvent A) was replaced by the solvent described in Table 14. Problems of nozzle blockage and intermittent firing were encountered when printing from a Hewlett Packard HP560C printer. The resultant prints were of very poor quality. The ROD measurements of these prints are given below in Table 14.

TABLE 14

| Comparative Example | Solvent A | Solvent B | ROD (Xerox 4024 paper) | ROD (Conqueror paper) |
|---|---|---|---|---|
| 4 | Water | 2-P | 0.532 | 0.486 |
| 5 | 2-P | 2-P | — | 0.562 |

What is claimed is:

1. An ink composition comprising water, a water-dissipatable polyester bearing ionized sulphonate groups, a disperse dye or a solvent soluble dye or a mixture of such dyes, a water-immiscible organic solvent and a water miscible organic solvent.

2. An ink composition according to claim 1 comprising:
   (a) from 0.1 to 20 parts of said dye(s);
   (b) from 0.5 to 50 parts of a water-dissipatable polyester;
   (c) from 40 to 90 parts of water,
   (d) from 2 to 30 parts of a water-immiscible organic solvent; and
   (e) from 2 to 60 parts of a water-miscible organic solvent;
wherein all parts are by weight and the total number of parts of (a)+(b)+(c)+(d)+(e) add up to 100.

3. An ink composition according to claim 1 or 2 wherein the water-immiscible organic solvent is an aromatic hydrocarbon, a chlorinated hydrocarbon, an ester, an alcohol having six or more carbon atoms, an ether having at least 5 carbon atoms, a low odour petroleum distillate, turpentine, white spirits, naphtha, isopropyl biphenyl, terpene, vegetable oil, mineral oil, essential oil, a natural oil, or a mixture of any two or more thereof.

4. An ink composition according claim 1 or 2 wherein the water-immiscible organic solvent is toluene, xylene, naphthalene, tetrahydronaphthalene, methyl naphthalene, chlorobenzene, fluorobenzene, chloronaphthalene, bromonaphtalene, butyl acetate, ethyl acetate, methyl benzoate, ethyl benzoate, benzyl benzoate, butyl benzoate, phenylethyl acetate, butyl lactate, benzyl lactate, diethylene glycol dipropionate, dimethyl phthalate, diethyl phthalate, dibutyl phthalate, di(2-ethylbexyl)phthalate, hexanol, octanol, benzyl alcohol, phenylethanol, phenoxy ethanol, phenoxy propanol, phenoxy butanol, anisole, phenetole, or a mixture of any two or more thereof.

5. An ink composition according to claim 1 or 2 wherein the water-immiscible organic solvent is benzyl alcohol.

6. An ink composition according to claim 1 or 2 wherein the water-miscible organic solvent is:
   (a) a cyclic ester or cyclic amide;
   (b) a water-miscible $C_{1-6}$-alkyl mono ether of a $C_{2-6}$-alkylene glycol or $C_{1-6}$-alkyl mono ether of poly($C_{2-6}$-alkylene glycol); or
   (c) a mixture of (a) and (b).

7. A process for the coloration of a substrate comprising printing an ink composition onto the substrate using an ink jet printer, characterized in that the ink composition is as defined in claim 1 or 2.

8. A process according to claim 7 wherein the substrate is a paper, a transparent material or a textile material.

9. A process for preparing an optical filter comprising applying to a transparent substrate an ink composition according to claim 1 or 2, thereby forming a colored cross-linked polymeric coating on the substrate.

10. A process for the coloration of a synthetic textile material with an ink composition according to claim 1 or 2 which comprises the steps:
    (i) applying the ink composition to the textile material by ink jet printing; and
    (ii) heating the printed textile material at a temperature from 50° C. to 250° C. to fix the dye on the material.

11. A transfer printing process comprising the steps:
    (i) applying an ink composition according to claim 1 or 2 to a first substrate thereby resulting in a first substrate carrying an image;
    (ii) bringing the image resulting from step (i) into contact with a second substrate;
    (iii) heating the first substrate thereby transferring the image to the second substrate.

12. A process for the preparation of an ink composition according to claim 1 or 2 which comprises mixing together
    (i) a solution of a disperse dye or a solvent soluble dye or a mixture of such dyes in a water-immiscible organic solvent; and
    (ii) a water-dissipatable polyester, optionally in water; provided that either or both of (i) and (ii) further contains a water-miscible organic solvent.

13. A process according to claim 12, which further comprises mixing the resultant mixture with water.

14. An ink composition to claim 1 wherein the ratio of the water-miscible organic solvent to water-immiscible organic solvent is 19:1 to 1:1 by weight.

* * * * *